United States Patent [19]

Kampe et al.

[11] Patent Number: 4,602,426
[45] Date of Patent: Jul. 29, 1986

[54] METHOD OF PRODUCING A GAS DIFFUSION ELECTRODE

[75] Inventors: Dennis J. Kampe, Parma; Paul S. Sirocky, Brookpark, both of Ohio

[73] Assignee: Union Carbide Corporation, Danbury, Conn.

[21] Appl. No.: 750,749

[22] Filed: Jun. 28, 1985

[51] Int. Cl.[4] .............................................. H01M 6/00
[52] U.S. Cl. ..................................... 29/623.1; 429/42; 429/44; 264/41; 427/115
[58] Field of Search ........................ 429/40, 42, 44, 45, 429/209, 212; 29/623.1, 623.5; 427/115, 243; 419/2, 48, 65, 66; 264/44, 104, 105, 241, 297.4, 41; 141/1.1; 252/182.1

[56] References Cited

U.S. PATENT DOCUMENTS 3,385,780 7/1964 Feng ..................................... 204/294
3,594,236 7/1971 Boden et al. ...................... 252/182.1

FOREIGN PATENT DOCUMENTS 2111095 9/1972 Fed. Rep. of Germany .

Primary Examiner—Anthony Skapars
Attorney, Agent, or Firm—Aziz M. Ahsan

[57] ABSTRACT

A gas diffusion electrode having a progressive change in active material concentration over its thickness. Also, a method of producing a gas diffusion electrode by applying a finely divided wetproofing mixture and a plurality of different finely divided active mixtures in superimposed layers to a current collector, the layers being arranged in progressively increasing weight proportion of active material, and thereafter pressing and forming a porous electrode.

20 Claims, 1 Drawing Figure

TAFEL COMPARISON

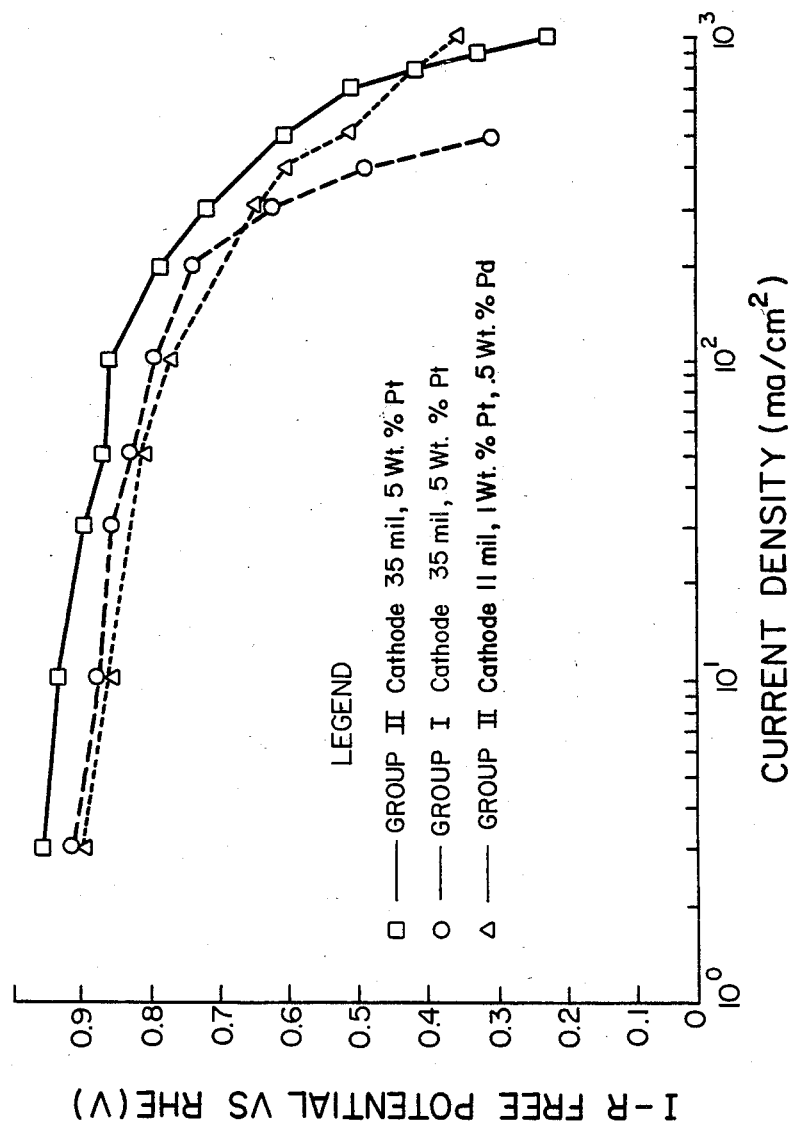

METHOD OF PRODUCING A GAS DIFFUSION ELECTRODE

BACKGROUND OF THE INVENTION

This invention relates to improved gas diffusion electrodes for use in primary batteries, fuel cells and in electrochemical cells such as those used in alkali metal halide electrolysis processes.

In the above applications, the electrodes have different size and current density requirements but research and development carried out with respect to these types of electrodes generally seeks to either increase the operating current density for a given voltage savings or to increase voltage savings at a given current density.

Structurally, gas diffusion electrodes used as cathodes or anodes are layered composites comprising an electrochemically active layer and a wetproofing layer. In at least one major method of manufacturing, these electrodes have been made by first pressing separately an active layer containing active material, a fluorocarbon polymer such as polytetrafluoroethylene and a pore-forming salt, and a wetproofing layer containing the fluorocarbon polymer and the salt. The two preformed layers are then pressed together. A metallic screen current collector may also be embedded into the active layer to form a three-layered structure.

Problems have developed with electrodes produced by this method. Often, after a short time in service, delamination or disbonding occurs between the active and wet proofing layers with electrodes made in this manner. Bubbles are seen to form in the wetproofing layer which appears to expand. When this structural problem occurs, the cell ceases to operate and this can disrupt performance of multi-unit, stacked cell assemblies.

Other methods for producing gas diffusion electrodes also have been reported.

U.S. Pat. No. 3,385,780 discloses the production of a porous electrode by placing a mixture of an electrically conductive substance, a hydrophobic polymer, and a removable filler in a press, placing thereover a mixture of the hydrophobic polymer and the removable filler, pressing the two mixtures together, and then removing the filler material.

German Patent Application No. 2,111,095 describes a method of producing electrodes by separately filtering wet suspensions of active and wetproofing material in layers to form "filter cakes". The active layer may contain a conductive grid. The filter cake layers are then stacked, pressed together, and sintered to form an electrode. The German Application further discloses that an electrode can be produced by filtering an active suspension through the pores of a wetproofing layer filter cake and then pressing and sintering the filter cake.

U.S. Pat. No. 3,594,236 discloses a method of producing an air electrode by first pressing a sheet containing a fluorocarbon polymer and a pore forming agent and thereafter applying a layer of a catalyst and a metallic grid on the fluorocarbon polymer sheet and hot pressing the assembly to form a unitary electrode structure.

OBJECT OF THE INVENTION

An object of this invention is to provide a method for producing an improved gas diffusion electrode which exhibits improved resistance to delamination and disbonding in use.

Another object of the invention is to provide a method for preparing gas diffusion electrodes which is characterized by simplicity in the manufacturing steps and simultaneously a reduction in the scrap level.

A further object of the invention is to provide an electrode having improved performance at higher current densities owing to its higher mass transport capabilities.

SUMMARY OF THE INVENTION

This invention relates in one aspect to a method for producing a gas diffusion electrode comprising the steps of:

(a) preparing a dry, finely divided wetproofing mixture comprising a wet proofing agent and a pore forming agent;

(b) preparing a plurality of dry, finely divided active mixtures each comprising an electrochemically active material, a wetproofing agent, and a pore forming agent, the active mixtures each containing a different weight proportion of electrochemically active material;

(c) providing an electrically conductive current collector;

(d) applying said wetproofing and active mixtures in superimposed layers to the current collector, the active mixture layers all being present on one side of the wetproofing mixture layer and arranged therefrom in layers of progressively increasing weight proportion of electrochemically active material, at least one active mixture layer being contiguously associated with the current collector, to form an article comprising a current collector and a multiplicity of superimposed layers of finely divided loose mixtures of particles;

(e) pressing the article to form an electrode; and (f) removing the pore-forming agent from the electrode.

In another aspect, the invention relates to a gas diffusion electrode comprising:

(a) a porous wetproofing layer comprising a wetproofing agent at an outermost side of said electrode;

(b) a porous active layer at an outermost side of said electrode opposite said wetproofing layer, the outermost porous active layer comprising a mixture of an electrochemically active material and a wetproofing agent;

(c) at least one additional porous active layer between said outermost porous active layer and said porous wetproofing layer, said additional porous active layer comprising a mixture of an electrochemically active material and a wetproofing agent, said outermost and additional active layers each containing different weight proportions of electrochemically active material and arranged from said wetproofing layer in order of progressively increasing weight proportion of electrochemically active material;

(d) a transition zone between each of the adjacent layers, each of said zones comprising a mixture of the constituents of the adjacent layers so as to provide an essentially smooth electrochemically active material composition gradient between adjacent layers; and (e) an electrically conductive current collector in contiguous association with at least one of said active layers.

BRIEF DESCRIPTION OF THE DRAWING

The sole FIGURE of this application shows the half cell voltage vs. current density behavior of cathodes made from prebonded layers and from dry powder mixture layers.

DESCRIPTION OF THE INVENTION

The present invention is an improved gas diffusion electrode and a method of producing it to improve performance and reduce structure delamination and disbonding during operation at high current densities. The components used to produce the gas diffusion electrode comprise:

(1) An electrically conductive current collector which delivers electrical current to or from the regions of the electrode, depending how the electrode is used. Various electrically conductive materials may be used, for instance, metals, and they may be fashioned in various shapes, for instance, grids, meshes or screens. In the preferred embodiment of the present invention, a silver-plated nickel screen is used.

(2) An electrochemically active material which provides the reaction sites where the cell electrolyte and gases can react, such as activated carbon or sintered metal powders. In the preferred embodiment of this invention activated carbon is used, optionally doped with a precious metal catalyst in amounts ranging from 0.1% to 10.0% by weight of the carbon. The preferred precious metals are silver, gold and metals of the platinum group including platinum, palladium, rhodium, ruthenium, osmium and iridium. The activated carbon is used in dry, finely divided form with a preferred particle size of 0.02 to 10 microns.

(3) A wetproofing agent such as a fluorocarbon polymer of polyethylene which increases the hydrophobicity of the electrode and helps retain the electrolyte within the cell. Fluorocarbon polymers which can be used include tetrafluoroethylene, polytetrafluoroethylene (PTFE) or fluorinated ethylenepropylene. The wetproofing agent should be dry and finely divided, with a preferred particle size of 0.1 to 10 microns.

(4) A pore-forming agent which is mixed with the other components before the electrode is formed and which is thereafter removed, for instance, by heating or by a solvent, to leave a porous electrode structure. Pore-forming agents which can be utilized in the practice of this invention include salts such as calcium formate or sodium carbonate. The particle size of the pore-forming agent and the resulting electrode pore size can range from 2 to 50 microns and are preferably 5 to 20 microns to allow gas transport while restricting liquid electrolyte flow.

In the electrode produced according to this invention, a composition gradient of the above described electrochemically active material will be present through the thickness of the electrode. In other words, the electrochemically active material will be present in a maximum amount on one surface of the electrode and a minimum amount on the opposite surface, with a controlled gradient of electrochemically active material between. The electrode will have embedded therein an electrically conductive current collector in contact with the electrochemically active material.

The graded structure of the electrode is produced by preparing a dry finely divided wetproofing mixture and a plurality of dry finely divided active mixtures. The wetproofing mixture comprises a wetproofing agent and a pore forming agent. The active mixtures each comprise an electrochemically active material, a wetproofing agent, and a pore forming agent, each mixture containing a different weight proportion of electrochemically active material. The active and wetproofing powder mixtures are then applied in layers to an electrically conductive current collector. The order of the layers after application is important to the practice of this invention. The mixture layers should be applied such that the active mixture layers are all present on one side of the wetproofing mixture layer and arranged therefrom in layers of progressively increasing weight proportion of electrochemically active material. The final layer order in the unpressed article will find the active mixture layer containing the highest weight proportion of electrochemically active material and the wetproofing mixture layer as outermost layers on opposite sides of the article. The current collector will be contiguously associated with at least one active mixture layer.

The superimposed layering of the dry, finely divided mixtures results in an active material composition gradient by providing a progressive change in average concentration between adjacent layers and also by providing a transition zone between adjacent layers in which there is an essentially smooth composition gradient between the average composition of the adjacent layers. As used herein, the phrase "essentially smooth composition gradient" refers to a progressive change in concentration over a finite transverse distance between adjacent layers of dry powder mixtures having different weight percents of the active material. The intermixing of the dry powder mixtures at the layer interfaces before the pressure forming of the electrode creates these transition zones, which can range from 1 to 25 microns, depending on the particle sizes and degree of intermixing. The presence of the smooth composition gradient in these transition zones is in contrast to the abrupt composition changes between layers in electrodes produced from preformed layers. The preforming of these layers allows essentially no intermixing of the components of the adjacent layers.

The active and wetproofing powder mixtures in the present invention are applied to the electrically conductive current collector before the complete electrode is pressed and bonded. In the finished electrode the current collector must be in contiguous association with electrochemically active material so as to provide electrical contact. The current collector thickness or configuration may be such that it contacts one or more layers or transition zones containing active material. In the preferred practice of this invention, the current collector should be at the surface in contact with the layer containing the highest concentration of electrochemically active material.

Only after the prepared mixtures are applied to the current collector as described above is the assembly pressed sufficient to bond the structure and form the electrode. The pressing is preferably performed "hot", i.e., at elevated temperature. Hot pressing is normally performed at temperature from about 60° to 350° C. and at pressure from about 1,000 to 10,000 psi (6.89 to 68.9 MPa) for a time sufficient to form a rigid assembly, usually 1 to 10 minutes.

After the electrode is pressed, it is processed to remove the pore-forming agent and produce a porous structure. Depending on the pore forming agent used, heat may be used to vaporize the agent, or a suitable solvent, for instance, water, methanol or acetone, may be used to leach out the agent.

A significant advantage of the present invention is that the controllably graded structure allows for efficient placement of electrochemically active material in the finished electrode, and in particular, the localization of relatively expensive precious metal catalyst if used therein. In the preferred embodiment of this invention, a precious metal catalyst is incorporated only in the active layer containing the highest concentration of electrochemically active material.

Electrodes made using the present invention further exhibit improved resistance to interlayer delamination compared to electrodes made from preformed layers made with the same wetproofing and active layer mixes. While not wishing to be bound by any specific theory, several reasons for the improved adhesion of the layers of the present invention electrodes are believed to be the following:

(a) The contact area between the adjacent dry mixture layers is increased by the nonparallel, i.e., wavy, nature of the layer surfaces.

(b) The different dry mixtures intermix at the layer interfaces upon deposition and pressing. As a result, smooth transition zones and not clear, well-defined boundaries are produced. Consequently, any hydraulic forces caused by the hydrophobic nature of the electrochemically active material and/or wetproofing agent are spread over a larger transverse distance and not concentrated at a boundary between layers of different wetting character.

(c) The pure compressive compaction of these powders reduces the likelihood that one or more layer interfaces have been smeared, i.e., nonhomogeneously subjected to shear forces. If local smears occur, regions of increased fluorocarbon polymer fibrillation and improved local hydrophobicity can result, producing potential stress points within and between preformed layer structures. Use of dry powders reduces this likelihood. The high permeability of the present invention electrodes (up to 10 times greater than a standard calendar cathode) suggests that locally restrictive smearing is not taking place.

These factors are believed to also provide advantage over the method of layering wet filtered active and wetproofing suspensions. Dry filtered suspension layers, while more pliable than prebonded layers, will not permit sufficient interlayer mixing at the interfaces compared to the method of the present invention. In addition, filtered suspension layers are prone to cracking during drying.

The method of the present invention allows the electrode to be bonded in one step. Thus it is possible, for example, to deposit the powders directly into a die cavity in a press unit, thereby reducing the transportation problems, increasing productivity, and reducing the likelihood of overmixing of the two or more powder types. In addition to using a press, other compaction techniques such as calendering or rolling can be used to press the powders. Because this method uses dry powders, any powder production processes which can produce powders of special form, shape and composition can be incorporated into this method to produce electrodes.

The wetproofing mixture may also contain a small amount of the electrochemically active material, but in a weight proportion lower than that of the lowest concentration active mixture. In the preferred embodiment of this invention, the wetproofing mixture contains no electrochemically active material.

The pore size and porosity may also be varied within the electrode by using pore forming agents of different sizes and proportions in the wetproofing and active mixtures.

Further, any granular material, for example fibers, can be incorporated into the electrode structure at well-defined and reproducible locations for improved performance and/or better strength and/or extended lifetimes.

Production of complete electrode and electrode frame assemblies is possible with this invention. These frames would hold the current collector in place in the die, allow for pressing and thereby reduce assembly costs and produce less scrap owing to reduced handling. A second current collector or other reinforcing member may be added to the mixture layers before bonding to improve stiffness.

Because the present invention electrodes are produced quickly and can be done "in situ," i.e., within the press with minimal transport, the likelihood of contamination of the components is reduced. In particular, where a hydroscopic salt is used as the pore-former, much lower levels of water pickup by the salt result. If contamination does occur, the interior of the pressed electrode is contaminated last, whereas for a structure with separately produced layers, the interfaces are destroyed first. This new process totally eliminates the need for storage and protection of individual prebonded layers.

In summary, the gas diffusion electrodes of the present invention can be produced in a simpler fashion, with improved properties, more efficient use of material, and less scrap.

The following examples are provided to further illustrate the present invention and are not intended to limit the scope of the invention in any manner.

EXAMPLE 1

A three layer air cathode was constructed according to the teachings of the present invention. Three different dry mixtures were prepared and successively layered over one another in a press die cavity. Layer 1 contained a finely divided mixture of 15.5% by weight PTFE, 50% by weight of sodium carbonate, and 34.5% by weight activated carbon, the carbon particles containing platinum in the amount of 0.5% by weight of carbon. Layer 2 contained a finely divided mixture of 20% by weight PTFE, 50% by weight sodium carbonate, and 30% by weight activated carbon (no platinum added). Layer 3 contained a finely divided mixture of 40% by weight of PTFE and 60% by weight sodium carbonate.

A silver-plated nickel screen of 0.0075 in. (0.19 mm) total thickness was placed first in the die cavity after which layers 1, 2 and 3 were sifted thereover through a 20 Tyler mesh screen and in that order. Each layer was lightly rolled by hand before the next was placed on top in order to produce relatively uniform layer thicknesses. The screen-embedded layered mixtures were then hot pressed at 150° C. and 2650 psi (18.3 MPa) pressure. The hot pressed article was then washed in distilled water to leach out the sodium carbonate pore former, leaving behind a porous electrode. The cathode was then dried in a nitrogen atmosphere at 70° C. for 48 hours.

The finished, dried cathode had a thickness of 0.015 in. (0.38 mm). The average layer composition by weight was as follows:
Layer 1: 31% PTFE, 69% Pt-catalyzed activated carbon.
Layer 2: 40% PTFE, 60% Activated carbon
Layer 3: 100% PTFE Gas permeability was found to be 1.45 cc/min/cm$^2$/cm H$_2$O ΔP and the weight per unit area was 0.14 g/cm$^2$.

The final electrode was a three layered cathode having an activated carbon composition gradient through the cathode thickness as a result of the layering of different carbon composition mixtures and the intermixing of layer components in the transition zones between layers. The transition zone thickness was approximately 5-10 microns in the finished cathode. The activated carbon concentration ranged from a low of 0% to a high of 69% by weight through the cathode thickness. The resulting cathode structure is able to resist interlayer separation to a greater degree than prior art structures.

EXAMPLE 2

A series of air cathodes were produced to test one aspect of the present invention, namely, the resistance of cathode layers to delaminating during service. The tests were designed to compare the performance of cathodes produced from preformed layers to those produced from layers which are applied in a dry powder form and then bonded.

Both sets of cathodes were two layer cathodes (one active mixture layer and one wetproofing mixture layer) and were produced using the same components in the same sizes and amounts. The active mixtures consisted of a finely divided dry mixture of 50% by weight sodium carbonate salt, 15% by weight polytetrafluoroethylene (PTFE), and 35% by weight activated carbon black which was doped with 5% by weight platinum. The wetproofing mixtures consisted of a finely divided dry mixture of 70% by weight sodium carbonate and 30% by weight PTFE.

The first group of air cathodes were produced by separately hot-calendaring equal thickness active and wetproofing mixtures, and then hot-pressing the two layers together with a silver-plated nickel screen between them.

The second group of cathodes were produced by placing the dry, finely divided active layer mixture in the die cavity of a press, placing a silver plated nickel screen on the active layer, and laying thereover the dry finely divided wetproofing layer mixture. The thickness of the two mixture layers was approximately equal. The powder mixture layers and screen were then hot pressed at 5,000 psi (34.5 MPa). Both sets of cathodes were leached in deionized water to remove the sodium carbonate pore former and then dried. The active layer composition after leaching was 70% Pt-doped carbon (66.7% carbon plus 3.3% platinum) and 30% PTFE by weight. The wetproofing layer was 100% PTFE by weight.

The physical properties of the two groups of cathodes are set forth below in Table 1:

TABLE 1

| | Thick Thickness in. (mm) | Initial Disbond Pressure* psi (KPa) | Gas Permeability cc/min/cm$^2$/cm H$_2$O ΔP | Wt/Area g/cm$^2$ |
|---|---|---|---|---|
| Group 1 | .035–.040 | 5–15 | 0.1–0.2 | 0.9–1.2 |
| | (.89–1.0) | (34.5–104) | | |
| Group 2 | .030–.035 | 5–10 | 0.7–1.8 | 0.8–1.0 |
| | (.76–.89) | (34.5–69) | | |

*static pressure required to disbond current collector from active and wetproofing layers.

Of particular significance and importance is the approximately ten-fold increase in the gas permeability of the Group 2 cathodes may be layering and then bonding dry powder mixtures as compared to those made from the Group 1 preformed layers.

Cathodes from both sets were then tested in half cells with the standard Tafel comparison of voltage (with respect to a reversible hydrogen electrode) versus current density. Another cathode was made by applying the dry powder mixtures in layers and then bonding the layers. This second Group 2 cathode was made in the same manner as the first except that the activated carbon contained 1% by weight Pt and 0.5% by weight Pd, and the total cathode thickness was only 0.011 in. (0.28 mm). The half cell electrolyte was 85° C. 10N NaOH. Four times the stoichiometric requirement of air was supplied for the reduction of water to hydroxyl ions.

The FIGURE shows the measured voltage as the current density through the cathodes was varied. A comparison of the 0.035 in. (0.89 mm) Group 1 and Group 2 cathodes shows that the Group 2 cathode has an approximately 50 mv higher voltage over most of the current density range than the equal thickness Group 1 cathode. The Group 2 cathode also has a limiting current density which is twice as high as that of the Group 1 electrode (1000 ma/cm$^2$ vs 500 ma/cm$^2$). The 0.011 in. (0.28 mm) Group 2 cathode containing considerably less precious metal catalyst has approximately equal voltage across most of the current density range compared to the thicker Group 1 cathode, and also has twice the limiting current density.

The two sets of 0.035 in. (0.89 mm) cathodes were then life tested at 300 ma/cm$^2$ and four times the required stoichiometric flow of air in the 85° C. 10N NaOH electrolyte. The Group 2 cathodes exhibited significantly longer life (4400 hours average vs 1400 hours average for Group 1 cathodes) and significantly higher voltage performance after 1000 hours (650 mv vs 450 mv for Group 1 cathodes). The Group 1 cathodes failed by delamination between the active and wetproofing layers. The Group 2 cathodes did not delaminate and failed only after electrolyte saturated the structure. When Group 2 cathodes were run at 500 ma/cm$^2$ current density, they still had an average life of 1200 hours.

The failure mode of the two sets of cathodes demonstrates the superiority of one aspect of cathodes made according to the present invention. Whereas preformed layer cathodes tend to fail by delamination, i.e. interlayer separation of the preformed active and wetproofing layers, the present invention cathodes will resist delamination and are expected to fail only after electrolyte leaks through the wetproofing layer. This failure mode suggests that the wetproofing layer characteristics can be modified to achieve even longer life.

While certain specific embodiments have been described herein, it will be obvious to one skilled in the art that they are not intended to limit the scope of this invention as described and claimed.

Having thus described the invention, what is claimed is:

1. A method of producing a gas diffusion electrode comprising the steps of:
   (a) preparing a dry, finely divided wetproofing mixture comprising a wetproofing agent and a pore forming agent;
   (b) preparing a plurality of dry, finely divided active mixtures each comprising an electrochemically active material, a wetproofing agent, and a pore forming agent, said active mixtures each containing a different weight proportion of electrochemically active material;
   (c) providing an electrically conductive current collector;
   (d) applying said wetproofing and active mixtures in superimposed layers to said current collector, the active mixture layers all being present on one side of the wetproofing mixture layer and arranged therefrom in layers of progressively increasing weight proportion of electrochemically active material, at least one active mixture layer being contiguously associated with said current collector, to form an article comprising said current collector and a multiplicity of superimposed layers of finely divided loose mixtures of particles;
   (e) pressing said article to form an electrode; and
   (f) removing said pore-forming agent from said electrode.

2. The method of claim 1 wherein said electrochemically active material is activated carbon.

3. The method of claim 2 wherein the activated carbon in at least one active mixture layer additionally contains a catalyst selected from the group consisting of silver, gold and metals of the platinum group including platinum, palladium, rhodium, ruthenium, osmium, and iridium.

4. The method of claim 3 wherein said catalyst is present in the outermost active mixture layer containing the highest weight proportion of activated carbon in the superimposed active mixture layers.

5. The method of claim 1 wherein said wetproofing agent is a fluorocarbon polymer.

6. The method of claim 5 wherein said fluorocarbon polymer is polytetrafluoroethylene.

7. The method of claim 1 wherein said wetproofing mixture contains no electrochemically active material.

8. The method of claim 1 wherein said wetproofing mixture additionally contains an electrochemically active material, the weight proportion of said electrochemically active material in said wetproofing mixture being less than the lowest weight proportion of electrochemically active material in said active mixtures.

9. The method of claim 2, wherein the particle size of the activated carbon ranges from 0.02 to 10 microns.

10. The method of claim 5 wherein the particle size of the fluorocarbon polymer ranges from 0.1 to 10 microns.

11. The method of claim 1, wherein the particle size of the pore-forming agent ranges from 2 to 50 microns.

12. The method of claim 1, further including the step of embedding a reinforcing member in said mixture layers prior to said pressing step (e).

13. The method of claim 1, further including the incorporation of dry fibers with said mixtures.

14. The method of claim 1 wherein said pressing is performed at temperature from about 60° to 350° C. and at pressure from about 1,000 to 10,000 psi.

15. A method of producing a gas diffusion electrode comprising the steps of:
   (a) preparing a dry, finely divided wetproofing mixture comprising polytetrafluoroethylene and pore-forming salt;
   (b) preparing a dry, finely divided precious metal-containing active mixture comprising polytetrafluoroethylene, a pore-forming salt, and activated carbon containing a precious metal catalyst selected from the group consisting of silver, gold, and metals of the platinum group including platinum, palladium, rhodium, ruthenium, osmium, and iridium;
   (c) preparing at least one additional dry, finely divided active mixture, said additional active mixture comprising polytetrafluoroethylene, a pore-forming salt, and activated carbon in a lower weight proportion than in said precious metal-containing active mixture;
   (d) providing an electrically conductive current collector;
   (e) applying said wetproofing and active mixtures in superimposed layers to said current collector, the active mixture layers all being present on one side of the wetproofing mixture layer and arranged therefrom in layers of progressively increasing weight proportion of activated carbon, the precious metal-containing active mixture layer being contiguously associated with said current collector, to form an article comprising said current collector and a multiplicity of superimposed layers of finely divided loose mixtures of particles;
   (f) hot pressing said article at temperature from about 60° to 350° C. and at pressure from about 1,000 to 10,000 psi to form an electrode; and
   (g) removing said pore-forming salt from said electrode.

16. The method of claim 15 wherein said wetproofing mixture contains no activated carbon.

17. The method of claim 15 wherein said wetproofing mixture additionally contains activated carbon in a weight proportion less than the lowest weight proportion of activated carbon in said active mixtures.

18. The method of claim 15 wherein the particle size of the pore-forming salt ranges from 2 to 50 microns.

19. The method of claim 15, further including the step of embedding a reinforcing member in said mixture layers prior to said hot pressing step (f).

20. The method of claim 15, further including the incorporation of dry fibers with said mixtures.

* * * * *